United States Patent

[11] 3,582,548

[72] Inventors Sergio Garberi
Ivrea;
Gian Franco Defalco, Banchette, both of, Italy

[21] Appl. No. 762,015
[22] Filed Sept. 24, 1968
[45] Patented June 1, 1971
[73] Assignee Ing. Olivetti C. & C. S. p. A. Torino, Italy
[32] Priority Sept. 30, 1967
[33] Italy
[31] 53,198 A/67

[54] PARITY CHECK DEVICE
24 Claims, 10 Drawing Figs.

[52] U.S. Cl. .......... 178/23A
[51] Int. Cl. .......... B41b 25/24
[50] Field of Search .......... 178/23.1, 26

[56] References Cited
UNITED STATES PATENTS

| | | | |
|---|---|---|---|
| 2,657,261 | 10/1953 | Rea .......... | 178/23(.1) |
| 2,884,487 | 4/1959 | Young .......... | 178/23(.1) |

*Primary Examiner*—Kathleen H. Claffy
*Assistant Examiner*—Jon Bradford Leaheey
*Attorney*—Birch, Swindler, and McKie and Beckett

ABSTRACT: A parity check device for code combinations comprising a plurality of binary code units. The device includes a plurality of elements which are shiftable between a pair of positions in response to the positioning of a corresponding binary code member. An indicator is provided for signalling whenever the positions of the elements are not in parity with a predetermined code combination. The signal may be given, for example, in response to the presence of an odd (or even as the case may be) number of ones.

PARITY CHECK DEVICE

CROSS-REFERENCE TO RELATED APPLICATION

Applicant claims priority from corresponding Italian Pat. application Ser. No. 53198-A/67, filed Sept. 30, 1967.

BACKGROUND OF THE INVENTION

1. Field of the Invention

The present invention relates to a parity check device for code combinations made up of a plurality of binary code units. The device has particular utility in conjunction with teleprinters, data processing equipment and the like having plurality of code members operable to be positioned individually in accordance with the binary units of a given code combination. In particular, the device includes an indicator adapted to selectively assume two different positions respectively signifying parity or disparity of a code combination.

2. Description of the Prior Art

In the field of machines for processing data or information in the form of code combinations, signals having the same binary value in each code combination are always even or odd in number. By requiring this value to always be even or to always be odd, it is possible to check on individual errors caused by malfunctioning of the mechanisms controlled by the individual signals or caused by incorrect generation of the signals themselves.

In a known check system, all code combinations are required to have an odd number of binary ones. If a particular code combination is represented by an even number of ones, a parity bit of one is associated with the combination so that the total number of ones becomes odd. If, on the other hand, the code combination contains an odd number of ones, the associated parity bit is zero.

In a known device based on the aforesaid system, when each code member is set in accordance with its associated signal, it shifts two arms, on each of which there is fixed an electrical contact adapted to cooperate with a pair of other electrical contacts disposed on fixed arms. These contacts are connected electrically so as to form a free circuit such that, for an odd number of code members set, it is opened, while for an even number of code members set it is closed. The device therefore becomes very costly and is extremely sensitive in operation.

SUMMARY OF THE INVENTION

With a view to obviating such drawbacks, the present invention provides a parity check device comprising a plurality of code members operable to be positioned individually in accordance with the binary units of a given code combination. The device comprises an indicator operable to selectively assume two different conditions respectively signifying parity or disparity of the like code units of the combination. Also included are an even number of mechanical elements grouped in pairs, at least some of the elements being shiftable between a pair of spaced positions in response to the positioning of a corresponding code member. A shiftable part is operably connected to each pair of elements, the latter acting jointly on the part to shift it into either of a pair of positions depending on the parity or disparity of the positions of the elements of the pair. Linking means are provided for interconnecting the indicator and the parts for operating the indicator to cause the latter to assume one or the other of its conditions depending on the parity or disparity of the positions of the parts.

In another aspect, the invention consists of a parity check device which includes at least one mechanism comprising a pair of first elements each of which are shiftable between a pair of spaced positions in response to the positioning of a corresponding binary code member. Also included is a second element shiftable between a pair of positions. The first and second elements are interconnected by an intermediate structure operable to shift the second element between its positions each time either of the first elements is shifted between its positions.

DESCRIPTION OF THE PREFERRED EMBODIMENT

A parity check device which embodies the principles and concepts of the invention, is broadly designated by the numeral 100. Device 100 is particularly adapted for being incorporated in the receiving arrangement of a teleprinter 110 of the start-stop type for eight-unit code combinations. Teleprinter 110 which is shown partially in FIG. 10, uses the seven-unit ISO alphabet code and for each code combination there is provided an eight parity unit in such manner as to bring the whole group of eight units to an even number of bits of the same value. However, for clarity and to illustrate more vividly the scope of the invention, device 100 will first be described without reference to the source of the code combinations to be checked.

Figure 1:
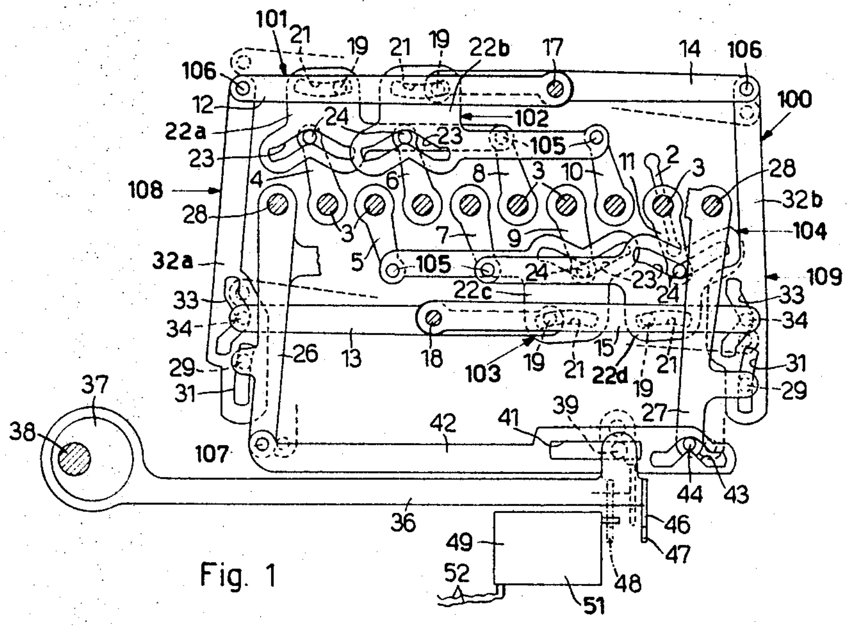
FIG. 1 is a side elevational view of a parity check device embodying the concepts and principles of the invention.

Referring to FIG. 1, one of the eight code receiving members of the machine is shown in the form of a bar designated by the numeral 2. For clarity the other bars 2 are not shown in FIG. 1; however, it is to be understood that each pivot pin 3 has a bar 2 associated therewith. Bars 2 are all alike and can rock between two limit positions about pins 3. Bars 2 are adapted to remain from time to time in their limit positions at least until a new combination is fed into the machine. Bars 2 can be set in one or the other of the two different positions under the control of the signals representing the code combination received in any known manner. For example, bars 2 can be set simultaneously and rhythmically under the control of the signals of a code combination received arrhythmically by an electromagnet, as described in the U.S. Pat. application Ser. No. 655,132, filed July 21, 1967 now U.S. Pat. No. 3,450,837. Bars 2 are operable to represent in this way various code combinations.

The parity check of the code units having the same value is effected by comparing the positions of a plurality of mechanical elements in the nature of cranks 4, 5, 6, 7, 8, 9, 10 and 11. Cranks 4—11 are connected to corresponding bars 2 for swinging therewith about pivot pins 3. Cranks 4—11 are disposed alternately on opposite side of pins 3 as shown. Hence, each of the cranks 4—11 is shiftable about a pin 3 between a pair of spaced positions in response to the positioning of a corresponding binary code member 2. More particularly, cranks 4—11 are arranged in pairs and compared. In this regard, the pairing may be established arbitrarily. In the embodiment illustrated; however, crank 4 is paired with crank 8; crank 5 with crank 9; crank 6 with crank 10; and crank 7 with crank 11.

A lever element part 12 is provided for cranks 4 and 8 and a similar lever element part 14 is provided for cranks 6 and 10, levers 12 and 14 being pivoted on a fixed pin 17. Similarly, a lever element part 13 is provided for cranks 5 and 9 while a lever element part 15 is provided for cranks 7 and 11, levers 13 and 15 being pivoted on a fixed pin 18.

Structure comprising an intermediate member in the nature of a connecting rod **22*a* is provided for interconnecting element 12 and its cranks 4 and 8 to present a mechanism 101. For this purpose, a pivot pin 19 on element 12 is slidably received within an arcuate slot 21 in rod 22*a*. Crank 8 is connected to rod 22*a* by a pivot 105. A pivot pin 24 on crank 4 is slidably received within an elongated guide in the nature of a longitudinally V-shaped slot 23 in rod 22*a*. Thus, rod 22*a* is connected to crank 4 by a slidable pivot presented by pin 24 and slot 23, and at the same time is connected to crank 8 by the relatively fixed pivot 105. Pivot 105 and pins 19 and 24 provide spaced, parallel axes of relative rotation for rod 22***a*.

Similarly, a rod 22*b* is provided for interconnecting element 14 and its cranks 6 and 10 to present a mechanism 102; a rod 22*c* is provided for interconnecting element 13 and its cranks 5 and 9 to present a mechanism 103; and a rod 22*d* is provided for interconnecting element 15 and its cranks 7 and 11 to present a mechanism 104. The mechanisms 102, 103 and 104 are substantially the same as mechanism 101, each including the slots 21 and 23, the pivot pins 19 and 24 and the relatively fixed pivot 105.

Each lever 12, 13, 14 and 15 is operable to assume the position shown in solid lines or the position shown in dashed lines in FIG. 1 (that is to say, each lever element 12—15 is shiftable between a pair of spaced positions), according to whether its corresponding cranks adopt like positions (condition of parity) or different positions (condition of disparity).

FIGS. 2, 3, 4 and 5 show cranks 4 and 8 of mechanism 101 in the four possible combinations of positions which they are able to adopt. When cranks 4 and 8 are disposed in like manner (FIGS. 2 and 4), pin 24 is in the center of slot 23, since the distance between the center of slot 23 and pivot 105 is equal to the distance between pins 3 of cranks 4 and 8. When cranks 4 and 8 are in different positions (FIGS. 3 and 5), pin 24 is in the left-hand bottom part or the right-hand bottom part respectively of slot 23, as a result of which rod 22*a* adopts a position which is turned clockwise about pivot 105 with respect to crank 8. It is therefore apparent that by virtue of the coupling means presented by pivot 105, pivot pin 24 and slot 23, connecting rod 22*a* can adopt four different locations in its own plane, shown respectively in FIGS. 2, 3, 4, and 5 which correspond to the four possible combinations of positions of cranks 4 and 8.

Figure 2:
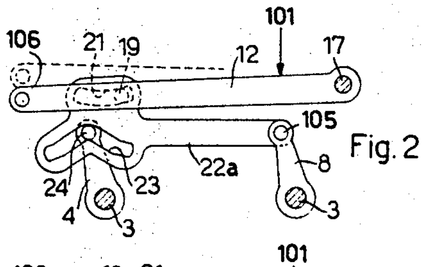
FIGS. 2 through 5 are side elevational views of a detail of the device, showing four different operative positions.
Figure 3:
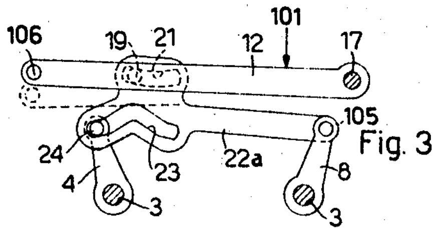
Figure 4:
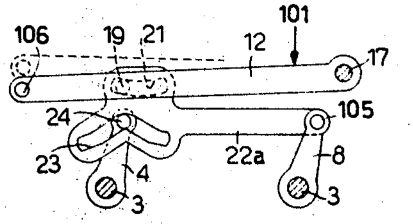
Figure 5:
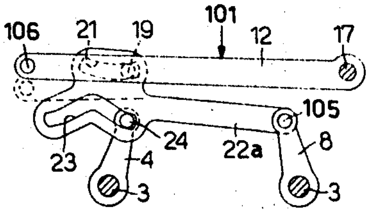
Figure 6:
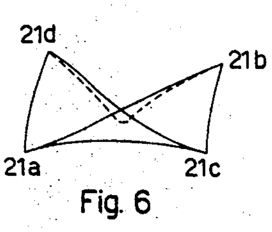
FIGS. 6 through 8 diagrammatically illustrate, on a larger scale, the paths of certain parts of the device.

In correspondence therewith, lever 12 on the other hand, can adopt only two different positions, namely the horizontal position shown in FIGS. 2 and 4 (condition of parity) and the position shown in FIGS. 3 and 5 in which it is turned clockwise about pin 17 (condition of disparity). This is true because of the nature of the connection means presented by pin 19 and slot 21, since slot 21 can slide on pivot pin 19. Thus, the horizontal components of the movement of connecting rod 22*a* are without effect on lever 12. Hence, rod 22*a* interconnects cranks 4 and 8 and lever 12 to shift lever 12 between its positions each time either corresponding crank (4 or 8) is shifted between its positions. FIG. 6 shows diagrammatically the paths along which the center of slot 21 of connecting rod 22*a* can travel. More particularly, the reference numerals 21*a*, 21*b*, 21*c* and 21*d* indicate the four positions of the center of slot 23, corresponding to the positions of connecting rod 22*a* in FIGS. 2, 3, 4 and 5, respectively. Manifestly, mechanisms 102, 103 and 104 operate in the same manner as mechanism 101.

Levers 12, 13, 14 and 15 are arranged in pairs. Such pairing may be arbitrarily determined; however, in the described embodiment, lever 12 is paired with lever 13 and lever 14 is paired with lever 15. An arm element 26 is provided for levers 12 and 13 while a similar arm element 27 is provided for levers 14 and 15. Arms 26 and 27 are each pivoted on a respective fixed pin 28 and each is shiftable between a pair of spaced positions to assume either the position shown in solid lines or the position shown in dashed lines in FIG. 1, according to whether the corresponding paired levers 12 and 13 or 14 and 15 have assumed like positions (condition of parity) or different positions (condition of disparity).

Structure in the nature of an intermediate connecting rod 32*a* is provided for interconnecting arm 26 and its corresponding levers 12 and 13 to present an assembly 108. For this purpose, a pivot pin 29 on arm 26 is slidably received within an arcuate slot 31 in rod 32*a*. Lever 12 is connected to rod 32*a* by a pivot 106. A pivot pin 34 on lever 13 is slidably received within a V-shaped slot 33 in rod 32*a*. Thus, rod 32*a* is connected to lever 13 by a slidable pivot presented by pin 34 and slot 33 and at the same time is connected to lever 12 by the relatively fixed pivot 105. Manifestly, rod 32*a*, arm 26 and levers 12 and 13 cooperate in substantially exactly the same manner as previously described for mechanism 101. Thus, rod 32*a* interconnects arm 26 and levers 12 and 13 to shift arm 26 between its positions each time either corresponding lever (12 or 13) is shifted between its positions. Further, arm 26 is shifted between its positions each time any one of the cranks 4, 5, 8 or 9 is shifted between it positions.

Figure 7:
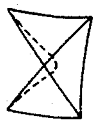

Similarly, a rod 32*b* is provided for interconnecting arm 27 and its corresponding levers 14 and 15 to present an assembly 109. Pivot 106, pins 29 and 34 and slots 31 and 33 provide an operation which is substantially identical to the operation of assembly 108. FIG. 7 illustrates diagrammatically the possible combinations of positions for levers 12 and 13 or for levers 14 and 15 and the paths along which the centers of slots 31 of rods 32*a* and 32*b* travel.

A connecting rod structure 42 is provided for interconnecting arms 26 and 27 and a rocking lever element 36, the head of the latter embracing an eccentric 37 fixed to a driving shaft 38. Shaft 38 is rotated continuously by an electric motor (not shown in the drawing). Lever 36 has a pin 39 engaged in slot 41 in rod 42. Rod 42 is pivoted to arm 26 at pivot 107. A pin 44 on arm 27 is slidably received within a V-shaped slot in rod 42. Thus, rod 42, lever 36 and arms 26 and 27 cooperate in substantially the same manner as previously described for mechanism 101.

The various connecting rods and levers form a tree of intermediate members converging to member 42 for actuating an indicator 51. Rocking lever 36 is moreover provided with a bent lug 46 adapted to cooperate by means of an extension 47 with the pushbutton 48 of the microswitch 49 of indicator 51. Indicator 51 is operable to selectively assume two different conditions respectively signifying parity or disparity of the like code units of the combination. Pushbutton 48 is normally in the inoperative state and keeps an electric circuit 52 open. When pushbutton 45 is actuated, circuit 52 is closed to send an electric signal signifying a disparity in the number of bars 2 which have adopted the same position.

Figure 8:
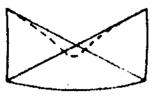

Rocking lever 36 is operable to shift into its lower position shown in solid lines or its upper position shown in dashed lines in the FIG. 1, depending on whether arms 26 and 27 have assumed like positions (condition of parity) or different positions (condition of disparity), respectively. Hence, rod 42 interconnects lever 36 and arms 26 and 27 to shift lever 36 between its positions each time either of the arms 26 or 27 is shifted between its positions. Manifestly, therefore, lever 36 is shifted between its positions each time any one of the cranks 4—11 is shifted between its positions. FIG. 8 illustrates diagrammatically the possible combinations of positions of arms 26 a nd 27 and the paths of travel of the center of slot 43 of connecting rod 42.

Figure 9:
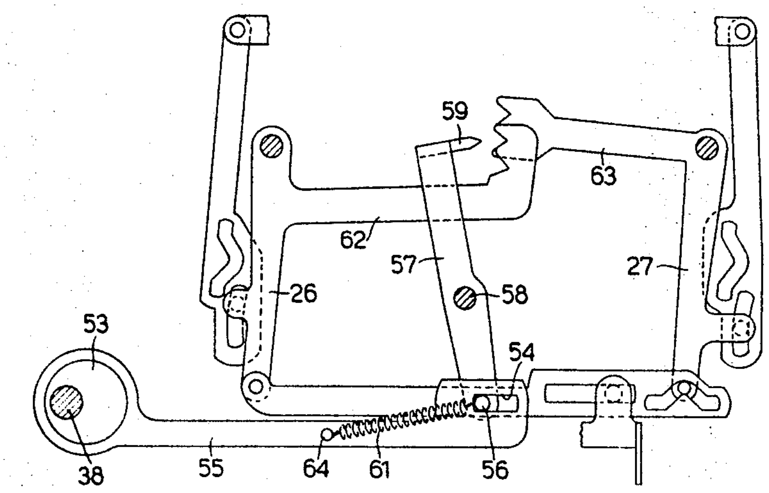
FIG. 9 is a cross-sectional view of a detail of the device.

Viewing FIG. 9 it can be seen that a second eccentric 53 is fixed on shaft 38. Eccentric 53 is similar to eccentric 37 and is embraced by the head of a rocking lever 55 provided with a slot 54. A stud 56 on a lever 57 is slidably received in slot 54. Lever 57 is pivoted at 58 and is equipped with a positioning blade 59. Blade 59 is adapted to cooperate with two serrated arms 62 and 63 which are integral with arms 26 and 27 respectively. A spring 61 is stretched between stud 56 and a second stud 64 on rocking lever 55.

In operation, shaft 38 normally rotates clockwise continuously and, by means of eccentric 37 and connecting rod 36 (which is guided by pin 39 in slot 41), causes lug 46 to oscillate continuously between the position shown in solid lines and that shown in chain-dotted lines in the FIG. 1. Normally, extension 47 is located below pushbutton 48 so that switch 49 is not rendered operative during oscillation of lug 46.

On the reception of each code combination, bars 2 are set simultaneously at a predetermined phase of the rotation of shaft 38, for example, after eccentric 37 has been rotated through about 60° in a clockwise direction form the position of FIG. 1, so that lug 46 is shifted slightly to the left in correspondence with the position shown in dashed lines. Immediately thereafter, eccentric 53 (FIG. 9) causes rocking lever 55 to shift to the left, thereby causing blade 59 to swing clockwise. Blade 59 thus locks arms 62 and 63 in the position reached to thereby fix the position of levers 12, 13, 14 and 15.

If bars 2 are disposed in a configuration of parity, that is a configuration such that the number of bars 2 which have the same position is even, then all four levers 12, 13, 14 and 15 will also necessarily be in a configuration of parity. Consequently, arms 26 and 27 will both be in the same position, so that rocking lever 36 will keep extension 47 below pushbutton 48 of switch 49.

If, on the other hand, bars 2 are disposed in configuration of disparity wherein the number of bars 2 which have adopted the same position is odd, then levers 12, 13, 14 and 15 will also be in a configuration of disparity. Consequently, arms 26 and 27 will be located in differing positions and rocking lever 36 will position lug 46 in the position shown in dashed lines, with extension 47 in alignment with pushbutton 48 of switch 49. Thus, as soon as eccentric 37 shifts rocking lever 36 to the left, extension 47 will press pushbutton 48 to close circuit 52. In this manner an electric signal is produced to signify the presence of an error in the code combination represented on bars 2. This signal may be used to give rise to a special "error service" in any known manner.

It is apparent, from an examination of FIG. 6, that when a pair of cranks (for example cranks 4 and 8) is shifted from one configuration of disparity (FIG. 3) to another (FIG. 5) the center of slot 23 of connecting rod 22*a* follows a path which tends at first to bring lever 12 into a position of parity and then to bring it back into a position of disparity. This movement is manifested momentarily in a vertical oscillation of lug 46, which, at the end of this oscillation, is located in its resultant position, in which it is not yet able to have an effect on pushbutton 48. Connecting rods 32*a* and 32*b* (FIG. 7) and connecting rod 42 (FIG. 8) move similarly.

It is obvious that the device described can be used for checking for odd parity of eight-unit code combinations. In fact, this depends solely on the conventional code chosen. In this case, the choice of the seven-unit alphabet and the eighth unit, the parity check unit, will be such as to bring the whole group of eight units for each combination to an odd number of like code units.

Moreover, the check system employed in this device is valid whatever the number of bars 2, obviously starting from a minimum of two. More particularly, the system is valid, for example, for seven bars 2. In this case, the conventional code chosen is such as to have six information units plus one check unit. It is sufficient, in this case, to lock any one of the bars 2, for example in the position of FIG. 1, and associate each of the remaining bars with a unit of the combination.

According to a variation of the invention, as explained previously, device 100 can be used as a generator for a check unit for the combinations, for example of the seven-unit ISO alphabet code. To this end, the device may be incorporated into the keyboard 111 of teleprinter 110. Keyboard 111 includes a series of seven code bars 65 (FIG. 10) similar to code bars 2 of FIG. 1, the bars 65 being adapted to rock about pins 66. Bars 65 are operable to be set simultaneously and selectively by a plurality of longitudinal sliders 67, only one of which can be seen in FIG. 10.

Figure 10:
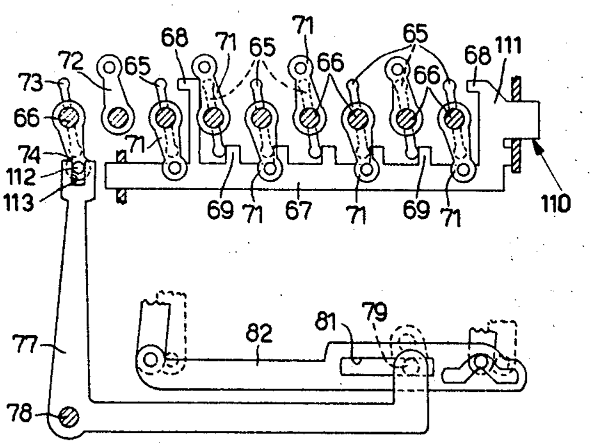
FIG. 10 is a cross-sectional view of the keyboard of a teleprinter incorporating a check device embodying the invention.

Sliders 67 are associated with a plurality of writing rods (not shown in the drawing) and can be shifted to the left on the depression of a corresponding key (not shown in the drawings) in the manner described in our U.S. Pat. No. 3,306,417. In FIG. 10 slider 67 is shown as corresponding to the character A according to seven-unit ISO code.

Each slider 67 is provided with long projections 68 and short projections 69, the projections being configured and positioned to act at diametrically opposite positions on the corresponding bar 65. More particularly, each projection 68 is adapted to swing the corresponding bar 65 counterclockwise, while each projection 69 is adapted to swing the bar 65 clockwise. Bars 65 are adapted to remain from time to time in the positions reached and thus to represent various code combinations.

A crank 71 is coupled with each bar 65 for rotation about a pin 66 in the same manner that crank 11, for example, is coupled with bar 2 for rotation about pin 3. The various cranks 71 are alike and are arranged alternately on opposite sides of pins 66 as shown in FIG. 10. For the purpose of generating a check unit, for example a parity check unit, there is provided alongside cranks 71 another crank 72 fixed to the frame of the machine in the position shown in FIG. 10. In this way, cranks 71 and crank 72 correspond substantially to cranks 4—11 of FIG. 1. Moreover, alongside code bars 65 there is provided another check bit bar similar to bars 65. Fixed to pin 66 of bar 73 is another crank 74 which has a pin 112, the latter being slidably received within a slot 113 in a lever 77. Lever 77 rotates about a fixed pivot 78 and has a pin 79 which is slidably received in a slot 81 in a connecting rod 82.

Connecting rod 82 corresponds substantially to connecting rod 42 of FIG. 1 and is adapted to set lever 77, in the same manner as first described in the case of connecting rod 42, in one of two positions shown in solid lines and dashed lines, respectively, in FIG. 10, according to whether cranks 71, together with fixed crank 72, represent a configuration of parity, or a configuration of disparity, respectively, of code units of the same sign.

On the depression of each key of the keyboard, the corresponding slider 67 is shifted toward bars 65 which are thereby set by projections 68 and 69 in accordance with a combination of the seven-unit ISO code. Simultaneously, bar 73 is set by lever 77, as hereinbefore described, in accordance with a code unit if a sign such that bars 65, together with bar 73, assume a configuration of parity.

We claim:

1. A parity check device including at least one mechanism comprising:

a pair of input elements each one shiftable between a pair of positions spaced a predetermined distance, in response to the positioning of a corresponding binary code member;

a connecting rod having at one end a pivotal connection with one of said pair of input elements to cause said rod to be shifted at one of two transverse locations in response to the positioning of said one input element at its pair of positions;

a first sliding pivot connecting said rod at the other end to the other of said pair of input elements, said first sliding pivot comprising a pin cooperating with a V-shaped guide, said guide being extended substantially parallel to said rod and having a length substantially equal to twice said predetermined distance, to cause said rod to be located at one of two angular locations around said pivotal connection when said pivot engages either of the end portions of said V-shaped guide, and to be located at the other of said angular locations when said pivot engages the middle portion of said V-shaped guide;

an output element; and a second sliding pivot connecting said rod and said output element so as to condition said output element to be positioned at one of a pair of spaced positions when said rod is located at a corresponding one of said angular locations.

2. A parity check device including at least two separate mechanisms, said mechanisms being arranged in pairs, each pair of mechanisms representing an assembly, wherein the improvement comprises:

a pair of first elements included in each one of said mechanisms, each of said pair of first elements shiftable between a pair of spaced positions in response to the positioning of a corresponding binary code member, a first intermediate member included in each one of said mechanisms and conditionable by the corresponding pair of first elements to be positioned at four different locations corresponding to the four possible combinations of first element positions, a second element included in each one of said mechanisms and conditionable by said first intermediate member to be positioned at one of a pair of spaced positions when said first intermediate member is at either of two of its locations and to be positioned at the other of its pair of positions when said first intermediate member is at either of its other locations, a second intermediate member conditionable by the second elements of said pair of mechanisms to be positioned at four different locations corresponding to the four possible combinations of second element positions, and a third element conditionable by said second intermediate member to be positioned at one of a pair of spaced positions when said second intermediate member is at either of two of its locations and to be positioned at the other of its pair of positions when said second intermediate member is at either of its other locations, whereby said third element is shifted between its positions each time only one of the first elements of the assembly is shifted between its positions.

3. A parity check device comprising two of said assemblies set forth in claim 2 and further comprising:

a third intermediate member conditionable by the third elements of said two assemblies to be positioned at four different locations corresponding to the four possible combinations of third element positions, and a fourth element conditionable by said third intermediate member to be positioned at one of a pair of spaced positions when said third intermediate member is at either of two of its locations and to be positioned at the other of its pair of positions when said third intermediate member is at either of its other locations, whereby said fourth element is shifted between its positions each time only one of the first elements is shifted between its positions.

4. A device as set forth in claim 2, wherein each one of said intermediate members is formed of a connecting rod having at one end a pivotal connection with one of the corresponding pair of elements, cam means operative between the other end of said rod and the other of said corresponding pair of elements causing said rod to be located at one or the other of two angular locations around said pivotal connection.

5. A device as set forth in claim 4, wherein said cam means comprises a pin cooperating with a V-shaped guide, said guide being extended substantially parallelly to said rod and having a length substantially equal to twice the distance of the pair of positions where each one of the relevant elements can be shifted.

6. A device as set forth in claim 5, wherein a sliding pivot connects each one of said rods with the relevant element of the next following order with respect to the corresponding pair of elements.

7. A device as set forth in claim 2, wherein is included coupling means between each one of the said pairs of first and second elements and the first and second intermediate members, said coupling means being operable to position the intermediate members at said four different locations, and connector means between the first and second intermediate members and the corresponding second and third elements, said connectors being operable to position said corresponding second and third elements at said two positions.

8. A device as set forth in claim 7 wherein each said coupling means includes a stationary pivot connecting said intermediate members to one of said corresponding elements of the corresponding pair and a sliding pivot interconnecting said intermediate members to the other of said corresponding first element of the corresponding pair.

9. A device as set forth in claim 7 wherein said pivots provide spaced, parallel axes of relative rotation.

10. A device as set forth in claim 9 wherein said connector means includes a second sliding pivot providing an axis of relative rotation which is spaced from and parallel to said spaced, parallel axes.

11. A device as set forth in claim 7 wherein said sliding pivot includes an elongated guide in said intermediate member and a pin on said other element of the corresponding pair received in the guide.

12. A device as set forth in claim 11 wherein said guide is V-shaped.

13. A device as set forth in claim 7 wherein said connector means includes a sliding pivot.

14. A parity check device for use with teleprinters and data processing equipment having a plurality of code members operable to be positioned individually in accordance with the binary units of a given code combination, said device comprising:

an indicator operable to selectively assume two different conditions respectively signifying parity or disparity of the like code units of the combination;

an even number of mechanical elements grouped in pairs, at least some of the elements being shiftable between a pair of spaced positions in response to the positioning of a corresponding code member;

a shiftable part operably connected to each pair of elements, the latter acting jointly on the part to shift it into either of a pair of positions depending on the parity or disparity of the positions of the elements of the pair;

linking means interconnecting the indicator and the parts for operating the indicator to cause the latter to assume one or the other of its conditions depending on the parity or disparity of the positions of the parts, an intermediate member comprising a connecting rod interconnecting each part and its corresponding pair of elements, said member being shiftable into four different positions corresponding to the four possible combinations of positions of said its corresponding pair of elements, there being provided a fixed pivot interconnecting said connecting rod and one of the elements of said its corresponding pair and a sliding pivot interconnecting said rod and said other element of said its corresponding pair.

15. A device as set forth in claim 14 comprising an additional code member, an additional pair of mechanical elements, one of said additional pair of mechanical elements being operable by said additional code member and the other of said additional pair of mechanical elements being fixed, and an additional intermediate member connected to said additional pair of mechanical elements.

16. A device as set forth in claim 14 wherein each sliding pivot comprises a symmetrical guide.

17. A device as set forth in claim 14 wherein is included a secondary part for each pair of shiftable parts and a secondary member interconnecting each secondary part and its corresponding pair of shiftable parts, said secondary part being shiftable into either of a pair of positions, the interconnection between each pair of shiftable parts, the secondary part and the secondary member thereof being substantially the same as the corresponding interconnection between each pair of elements, the shiftable part and the intermediate member.

18. A device as set forth in claim 14 wherein is included a secondary part for each pair of shiftable parts and a secondary member interconnecting each secondary part and its corresponding pair of shiftable parts, said secondary part being shiftable into either of a pair of positions, the interconnection between each pair of shiftable parts, the secondary part and the secondary member thereof being substantially the same as the corresponding interconnection between each pair of elements, the shiftable part and the intermediate member.

19. A device as set forth in claim 16 wherein is included a secondary part for each pair of shiftable parts and a secondary member interconnecting each secondary part and its corresponding pair of shiftable parts, said secondary part being shiftable into either of a pair of positions, the interconnections between each pair of shiftable parts, the secondary part and the secondary member thereof being substantially the same as the corresponding interconnection between each pair of elements, the shiftable part and the intermediate member.

20. A device as set forth in claim 17 wherein is included a tertiary part for each pair of secondary parts and a tertiary member interconnecting each tertiary part and its corresponding pair of secondary parts, said tertiary part being shiftable into either of a pair of positions, the interconnection between each pair of secondary parts, the tertiary part and the tertiary member thereof being substantially the same as the corresponding interconnection between each pair of elements, the shiftable part and the intermediate member.

21. A device as set forth in claim 18 wherein is included a tertiary part for each pair of secondary parts and a tertiary member interconnecting each tertiary part and its corresponding pair of secondary parts, said tertiary part being shiftable into either of a pair of positions, the interconnection between each pair of secondary parts, the tertiary part and the tertiary member thereof being substantially the same as the corresponding interconnection between each pair of elements, the shiftable part and the intermediate member.

22. A device as set forth in claim 19 wherein is included a tertiary part for each pair of secondary parts and a tertiary member interconnecting each tertiary part and its corresponding pair of secondary parts, said tertiary part being shiftable into either of a pair of positions, the interconnection between each pair of secondary parts, the tertiary part and the tertiary member thereof being substantially the same as the corresponding interconnection between each pair of elements, the shiftable part and the intermediate member.

23. A device as set forth in claim 14 wherein the code elements are positioned simultaneously and rhythmically, said linking means comprising reciprocating means operating in synchronization with the code elements for controlling the actuation of the indicator with a predetermined time delay relative to the positioning of the code elements.

24. A device as set forth in claim 14 wherein the indicator includes a secondary code member positionable selectively by the linking means.

UNITED STATES PATENT OFFICE
CERTIFICATE OF CORRECTION

Patent No. 3,582,548 Dated June 1, 1971

Inventor(s) SERGIO GARBERI AND GAIN DEFALCO

It is certified that error appears in the above-identified patent and that said Letters Patent are hereby corrected as shown below:

Column 7, line 68, "corresponding first element" should read "corresponding element".

Signed and sealed this 11th day of April 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334